(12) United States Patent
Huss

(10) Patent No.: US 9,819,520 B1
(45) Date of Patent: Nov. 14, 2017

(54) METHOD OF ADAPTIVELY CONTROLLING THE PRE-CURSOR COEFFICIENT IN A TRANSMIT EQUALIZER

(71) Applicant: Cadence Design Systems, Inc., San Jose, CA (US)

(72) Inventor: Scott David Huss, Cary, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/380,932

(22) Filed: Dec. 15, 2016

(51) Int. Cl.
*H03H 7/30* (2006.01)
*H04L 25/03* (2006.01)

(52) U.S. Cl.
CPC .............................. *H04L 25/03057* (2013.01)

(58) Field of Classification Search
CPC ......... H04L 25/03019; H04L 25/03343; H04L 2025/03802; H04L 27/2626; H04L 2025/03808; H04L 2027/002; H04B 10/697
See application file for complete search history.

(56) References Cited

U.S. PATENT DOCUMENTS

| | | | | |
|---|---|---|---|---|
| 5,881,108 A * | 3/1999 | Herzberg | .......... | H04L 25/03343 375/285 |
| 6,650,698 B1 * | 11/2003 | Liau | .................... | H04L 25/4927 375/229 |
| 7,489,725 B2 * | 2/2009 | Jaffe | .................. | H03H 21/0012 375/233 |
| 2004/0008764 A1 * | 1/2004 | Seo | ................... | H04L 25/03343 375/229 |
| 2006/0072682 A1 * | 4/2006 | Kent | .................... | H04B 1/7097 375/267 |
| 2010/0329322 A1 * | 12/2010 | Mobin | .............. | H04L 25/03057 375/231 |
| 2010/0329325 A1 * | 12/2010 | Mobin | .............. | H04L 25/03343 375/232 |

* cited by examiner

*Primary Examiner* — Khanh C Tran
(74) *Attorney, Agent, or Firm* — Andrews Kurth Kenyon LLP

(57) ABSTRACT

A circuit and method for controlling a pre-cursor coefficient in an equalizer of a transmitter device. An input signal from the transmitter is converted into a data signal that includes data symbols transmitted in successive unit intervals. An error signal is formed by comparing the input signal to a threshold value. A determination is made whether to adjust the pre-cursor coefficient, by correlating a sample of the error signal with samples of the data signal from one unit interval earlier and two unit intervals earlier.

20 Claims, 7 Drawing Sheets

METHOD OF ADAPTIVELY CONTROLLING THE PRE-CURSOR COEFFICIENT IN A TRANSMIT EQUALIZER

FIELD OF THE INVENTION

The present invention relates to reduction of intersymbol interference through adaptive control of an equalizer in a transmitter.

BACKGROUND

Intersymbol interference (ISI) is a serious problem in digital communications systems. Post-cursor ISI occurs when an earlier symbol, composed of one or more bits transmitted at a specified symbol rate, interferes with a later symbol. Pre-cursor ISI occurs when a later symbol interferes with an earlier symbol. Serial link communications systems, such as Serializer/Deserializer (SerDes) systems, are particularly susceptible to pre-cursor ISI.

Various ways have been developed to reduce ISI at both the transmitter end and the receiver end of a communications system. Existing methods attempt to equalize transmitted data signals, with the objectives of correcting for the effects of channel attenuation and complete cancellation of ISI. A conventional serial receiver consists of an analog front end that generally includes a continuous time linear equalizer (CTLE), a sampler that quantizes the analog input into digital values, a decision feedback equalizer (DFE) that uses the quantized data to adaptively feedback a correction signal to the input of the receiver, and a timing recovery unit. CTLEs and DFEs are effective at removing post-cursor ISI, but fail to adequately correct pre-cursor ISI.

Some transmitters in serial link systems implement a feed-forward equalizer (FFE) in the transmitter to provide fixed, i.e., non-adaptive, post-cursor ISI cancellation. The FFE in these serial link systems does not provide any adaptive pre-cursor ISI correction. It is possible to implement an FFE in the receiver. In fact, some receivers include a discrete time FFE that is implemented in the analog or digital domain. Such receivers can handle both pre-cursor and post-cursor ISI, but are structurally complex and consume a large amount of power.

DETAILED DESCRIPTION

The present disclosure provides non-limiting representative examples referencing numerals to particularly describe features and teachings of different aspects of the invention. The described embodiments should be recognized as capable of implementation separately or in combination with each other. A person of ordinary skill in the art reviewing the present disclosure should be able to learn and understand the different described aspects of the invention. The described embodiments should facilitate understanding of the invention to such an extent that other implementations not specifically covered, but within the knowledge of a person of ordinary skill in the art having read the present disclosure, would be understood to be consistent with an application of the invention.

Embodiments of the present disclosure relate to a pre-cursor ISI correction technique in which an error sample is correlated with two consecutive, delayed data samples to adjust a pre-cursor tap in a transmitter located equalizer, in particular an FFE. The correlation algorithm may be executed by a receiver.

DFEs often use a Least Means Square (LMS) algorithm that calculates the correlation of the error relative to an earlier data symbol to set a tap weight of the DFE, thereby reducing post-cursor ISI. To perform the correlation, the data signal is delayed relative to the error signal. The DFE provides an orthogonal correction, meaning a particular DFE tap will correct ISI only at one position in the impulse response of the DFE and will not affect the DFE's response at other positions.

The present disclosure proposes using an LMS or other correlation algorithm for pre-cursor ISI correction. In contrast to post-cursor correction, the error signal is delayed relative to the data signal so that an error sample is correlated with a data sample positioned at the pre-cursor. Unlike a DFE, FFEs are not orthogonal. The pre-cursor coefficient applied to an FFE tap will affect other positions, in particular the pre-cursor position that is one sample earlier than the pre-cursor closest to the main cursor. The pre-cursor closest to the main cursor will be corrected properly, but the second pre-cursor will be over-corrected. Accordingly, the present disclosure proposes to correlate an error sample with two consecutive delayed data samples when correcting a pre-cursor. This method of correlation provides for less overall ISI compared to using only one data sample. Additionally, the correlation will converge to a lower tap weight, which is beneficial since most transmitters require the sum of the magnitudes of all tap coefficients to remain constant so that it is desirable to use as little transmit equalization as necessary for the pre-cursor tap, thereby maximizing the magnitude that can potentially be assigned to a main tap (the tap associated with a main cursor), and thus improving the noise immunity of the receiver.

Figure 1:
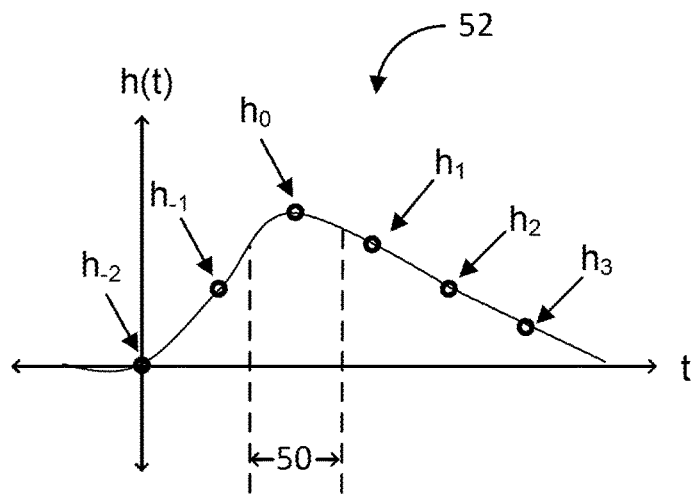
FIG. 1 shows a hypothetical impulse response signal for an input to a receiver.

FIG. 1 shows a hypothetical impulse response signal 52 for an input to a receiver. Data signals can be voltage or current signals, but for discussion purposes, assume that data are transmitted using voltages. The signal 52 is supposed to carry a logical 1 value, e.g., a single pulse with a peak above a minimum threshold voltage for 1 and surrounded on both sides by voltages below a maximum threshold voltage for 0. Instead, the signal 52 is severely distorted by ISI and has a very low peak that spreads out beyond a time interval 50 corresponding to a main cursor of the signal 52, spreading into a pre-cursor region and a post-cursor region. The interval 50 is one unit interval (UI) in length and includes a main cursor sample $h_0$. The pre-cursor region includes a first pre-cursor sample $h_{-1}$ and a second pre-cursor sample $h_{-2}$. The post-cursor region includes three post-cursor samples $h_1$, $h_2$, and $h_3$. These samples are 1 UI apart from each other, and each sample corresponds to an individual data symbol.

Figure 2:
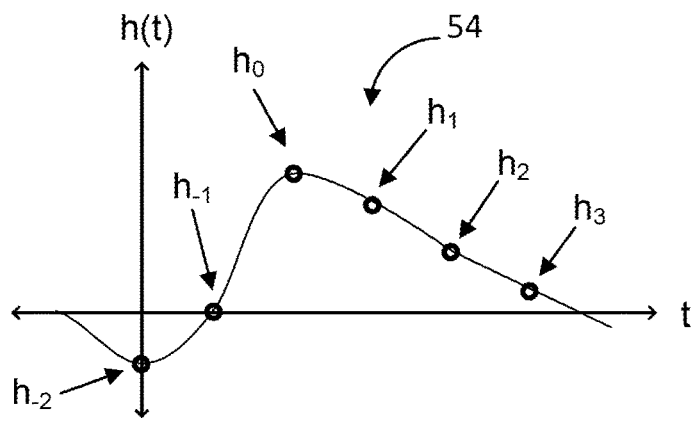
FIG. 2 illustrates the impulse response signal of FIG. 1 after the pre-cursor has been corrected using a first pre-cursor sample.

FIG. 2 shows what could happen to the impulse response in FIG. 1 if the pre-cursor were corrected with an FFE using only pre-cursor sample $h_{-1}$. Although the pre-cursor at sample $h_{-1}$ may be corrected properly, the pre-cursor at $h_{-2}$ is over-equalized to form a signal 54 in which the pre-cursor at $h_{-2}$ is shifted downwards, in the negative direction.

Figure 3:
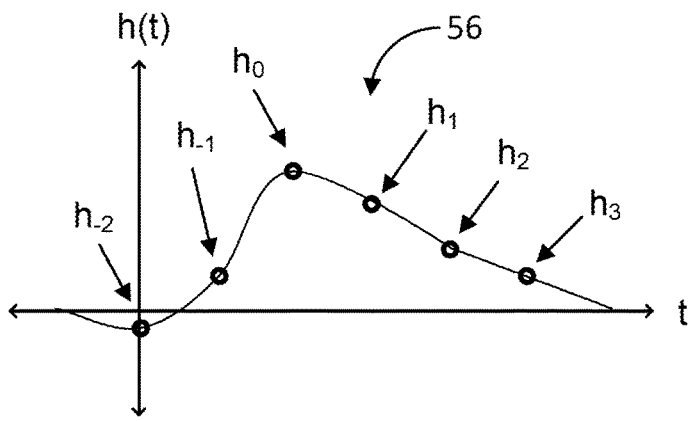
FIG. 3 illustrates the impulse response signal of FIG. 1 after the pre-cursor has been corrected using first and second pre-cursor samples.

FIG. 3 shows what could happen to the impulse response if the pre-cursor were corrected with an FFE using both $h_{-1}$ and $h_{-2}$. The resulting signal 56 has significantly less overall ISI. In particular, the pre-cursor at $h_{-2}$ is not over-equalized nearly as much as in FIG. 2, and the pre-cursor at $h_{-1}$ is sufficiently corrected.

Figure 4:
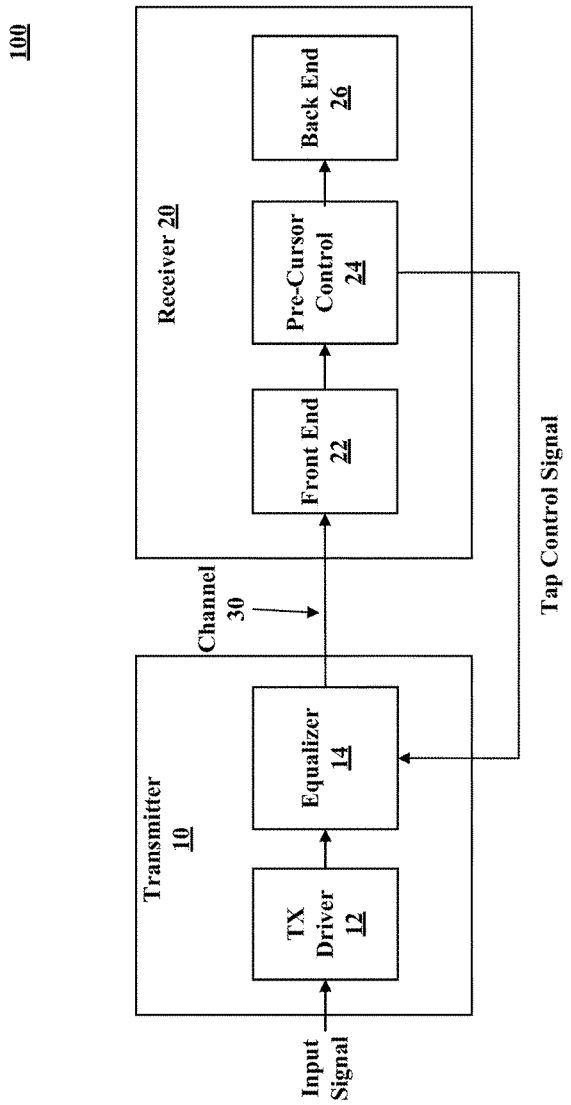
FIG. 4 is a block diagram of a communication system according to an embodiment of the present disclosure.

FIG. 4 is a block diagram of a communication system 100 according to an embodiment of the present disclosure. The system 100 includes a transmitter 10, a receiver 20, and at least one channel 30 connecting the transmitter to the receiver. The channel 30 may be unidirectional or bidirectional. Each channel may transmit data differentially using a positive polarity data signal and a negative polarity data signal. However, a single-ended implementation is also possible.

The transmitter 10 receives an input signal to be transmitted and transmits a representation of the input signal using a transmission (TX) driver 12. The system 100 may be a serial communication system, in which case the input signal may be serialized before or after being input to the transmitter. The TX driver forms a differential signal based on the input signal. The differential signal has a specified amplitude, the value of which may vary depending on the communication standard by which the transmitter communicates with the receiver.

The transmitter 10 may include an equalizer 14, which could be implemented, for example using an FFE having adjustable tap weights. The FFE may include multiple tap positions, at least one of which is assigned to the pre-cursor position in an impulse response of the FFE. In the example embodiments described herein, the pre-cursor is assigned only one tap, with the remaining taps being allocated to positions associated with the main cursor and the post-cursor. Shown separately in FIG. 1, the equalizer 14 and the TX driver 12 can be combined into a single circuit block.

The input to the receiver 20 is processed through an analog front end 22, which may include an AC coupling network, a sampler, and a deserializer. The front end 22 may include other signal conditioning elements, such as an equalizer circuit that provides additional equalization of the input. The front end 22 passes the processed input to a pre-cursor control unit 24, which analyzes the input to adjust the tap weight assigned to the pre-cursor position by sending a tap control signal to the equalizer 14 in the transmitter. The pre-cursor control unit 24 may be part of the same circuit that controls the other taps of the equalizer 14. Alternatively, the pre-cursor control unit 24 may be a separate control circuit. For simplicity, the elements for controlling the other taps have been omitted.

The receiver 20 may include a back end 26 that performs additional signal conditioning, for example using a DFE to correct the post-cursor of the input signal. The back end 26 may also include other conventional receiver components, such as a timing recovery unit that corrects the timing of the sampler and/or the deserializer.

Figure 5:
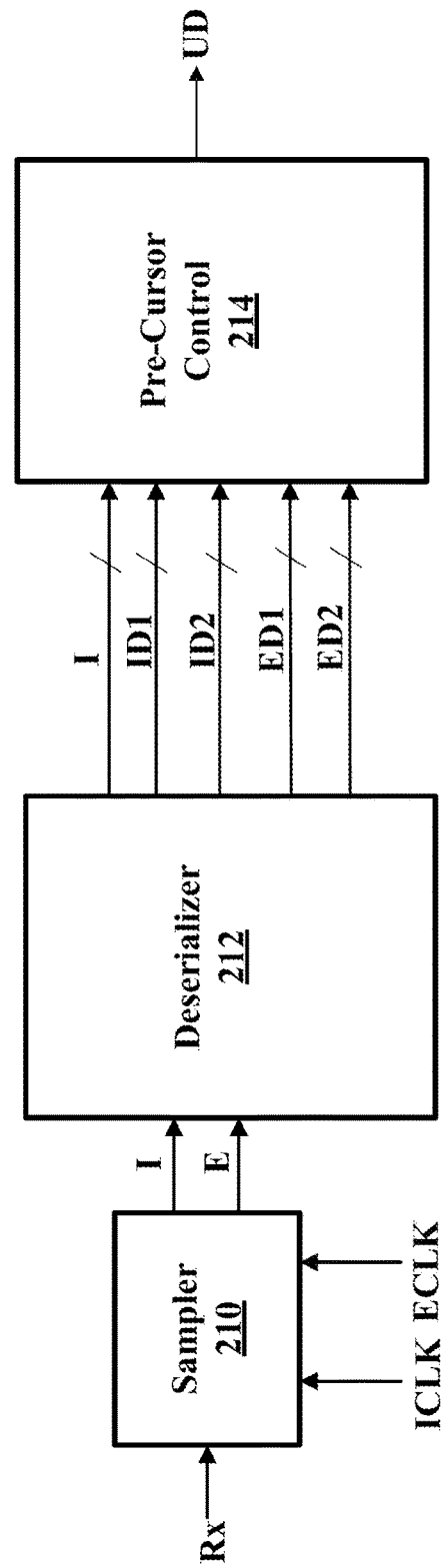
FIG. 5 is a block diagram of a partial receiver according to an embodiment of the present disclosure.

FIG. 5 is a block diagram of a partial receiver 200 according to an embodiment of the present disclosure. FIG. 5 illustrates details of the front end and pre-cursor control unit. The partial receiver 200 may include a sampler 210, a deserializer 212, and a pre-cursor control unit 214. The sampler 210 converts the received input Rx into digital 1's and 0's to form a stream of digital pulses. The sampler 210 may include analog-to-digital conversion elements such as comparators, voltage reference generators, memory latches, shift registers, etc. The output of the sampler 210 may include a first digital signal I representing the input data and a second digital signal E that is an error signal representing the difference between the input Rx and an expected input. The I and E signals are generated based on samples of the input Rx. The samples for the data signal I are taken at time intervals controlled by a data clock ICLK. Similarly, the samples for the error signal E are taken at time intervals controlled by an error clock ECLK. The ICLK and ECLK signals are in phase with each other, and thus the resulting I and E signals are also in phase.

The deserializer 212 processes the I and E signals to form a set of deserialized (parallel) inputs to the pre-cursor control unit 214. The parallel inputs include, in addition to the I signal, delayed versions of the I and E signals. Signals ID1 and ID2 correspond to the I signal delayed by one UI and two UIs, respectively. Similarly, signals IE1 and IE2 correspond to the E signal delayed by one UI and two UIs, respectively.

The pre-cursor control unit 214 processes the I, ID1, ID2, ED1 and ED2 signals to produce a signed binary control signal UD that is sent to a tap controller in the transmitter equalizer. The value of UD (+1, −1, or 0) indicates whether the pre-cursor tap should be adjusted up or down or left unchanged. The UD signal is periodically updated with new input to adaptively control the pre-cursor tap.

Figure 6:
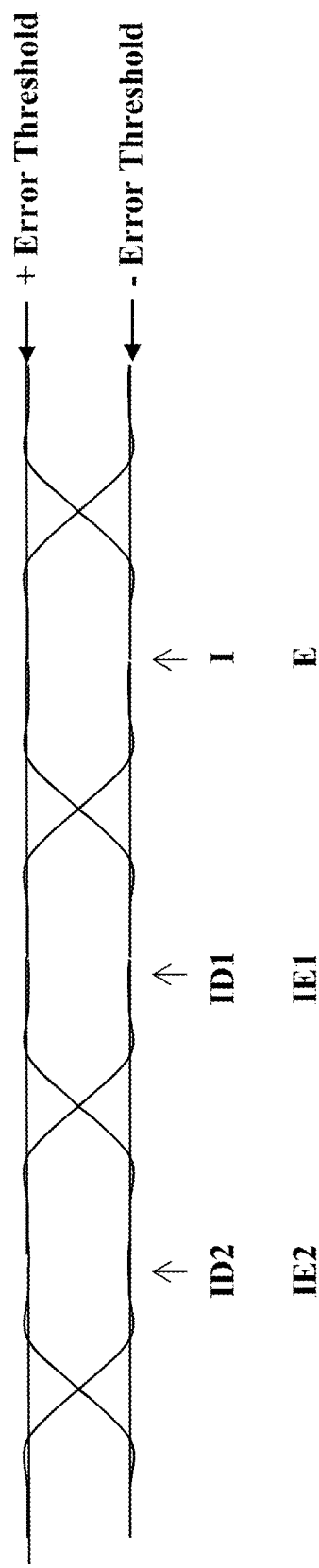
FIG. 6 is a timing diagram showing the relative timing of signals formed for use by a pre-cursor correction unit according to an embodiment of the present disclosure.

FIG. 6 is a timing diagram showing the relative timing of the signals formed by the deserializer. The error signal E may be formed by comparing the input Rx to one or more error thresholds. The error thresholds may, for example, include a positive error threshold associated with a logical 1 value, and a negative error threshold associated with a logical 0 value. An example embodiment will be described in which only the positive error threshold is used for pre-cursor correction.

Figure 7:
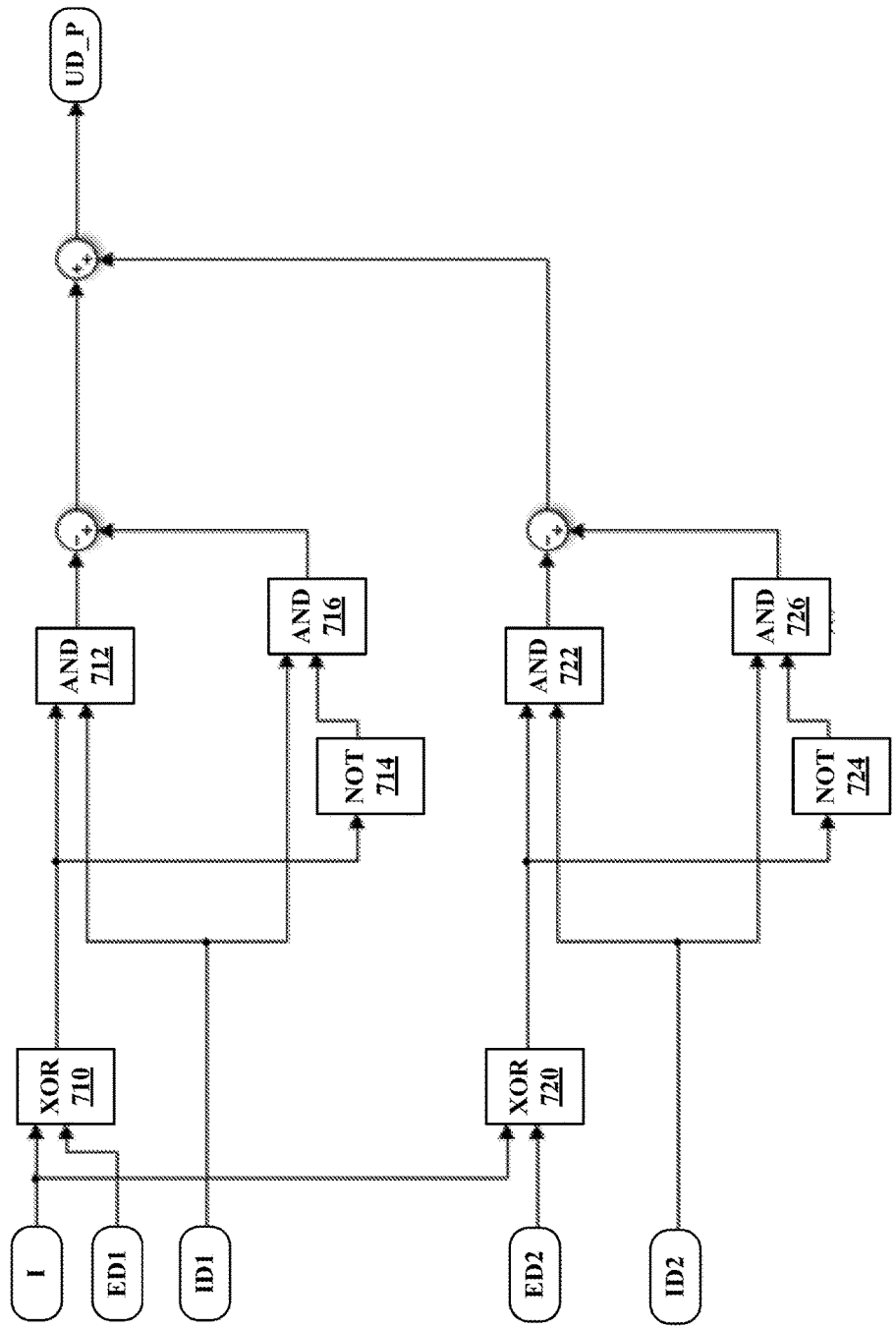
FIG. 7 illustrates pre-cursor control logic according to an embodiment of the present disclosure.

FIG. 7 illustrates control logic 700 that can be used to form the pre-cursor control unit, according to an embodiment of the present disclosure. The control logic 700 implements a sign-sign version of the following formula for calculating the pre-cursor control coefficient Cpre based on an LMS correlation, where $Cpre_N$ is the value currently being determined for the pre-cursor coefficient, $Cpre_{N-1}$ is the previous value of the pre-cursor coefficient, n denotes the present UI, n−1 denotes one UI earlier, n−2 denotes two UIs earlier, μ is the step size for the LMS algorithm, d corresponds to a sample of the I signal, and e corresponds to a sample of the E signal.

$$Cpre_N = Cpre_{N-1} + \mu(e_{n-1}d_n + e_{n-2}d_n) \quad \text{Eq. 1}$$

The sign-sign version of equation 1 is expressed as $$SS(Cpre_N) = Cpre_{N-1} + \mu(\text{sign}(e_{n-1})*\text{sign}(d_n) + \text{sign}(e_{n-2})*\text{sign}(d_n)) \quad \text{Eq. 2}$$

Equation 2 takes the sign of the data sample and multiplies it with the signs of the error samples. The sign of the E signal is +1 if the error is positive and −1 if the error is negative.

Since the signs can be represented using digital values (e.g., 1 for positive and 0 for negative), the multiplication reduces to an XOR function. Additionally, the error samplers needed to implement the sign-sign equation can be simplified if only one of the error thresholds in FIG. 6, e.g., the positive error threshold, is taken into consideration when forming the E signal. If only the positive error threshold is used, the E samples would only be valid when the corresponding I samples have a value of 1. Equation 2 could then be expressed as $$SS(Cpre_N) = Cpre_{N-1} + \mu((E_{n-1} \char`\^ D_n) \& D_{n-1} \char`\~ (E_{n-1} \char`\^ D_n) \& D_{n-1}) + (E_{n-2} \char`\^ D_n) \& D_{n-2} \char`\~ (E_{n-2} \char`\^ D_n) \& D_{n-2})$$  Eq. 3 where ^ denotes the XOR operation and & denotes the logical AND operation.

The logic 700 implements equation 3 and includes an XOR gate 710 that outputs the XOR of I and ED1, i.e., the sign of I multiplied by the sign of ED1. Similarly, an XOR gate 720 outputs the XOR of I and ED2. Various AND gates are used to select new samples only when the sign of a corresponding data signal is +1. For instance, XOR 710 and ID1 form inputs to AND gate 712 so that AND 712 only produces a 1 if ID1 is also 1. Similarly XOR 720 and ID2 form inputs to AND gate 722 so that AND 722 only produces a 1 if ID2 is also 1. These logic elements handle the situation in which the error is positive (e.g., the error sample has a value of 1).

To handle the situation in which the error is negative (e.g., the error sample has a value of 0), the outputs of XOR 710 and 720 are inverted by respective NOT gates 714 and 724 before being input to respective AND gates 716 and 726 together with their corresponding data signals ID1 and ID2. The output of AND 712 is subtracted from the output of AND 716. Similarly, the output of AND 722 is subtracted from AND 726. The subtraction results are summed together to produce a signal UD_P. A UD_P value of 1 indicates that the pre-cursor tap should be adjusted to add more pre-cursor, while a UD_P value of −1 indicates that less pre-cursor is needed, and a UD_P value of 0 indicates no change is needed.

Figure 8:
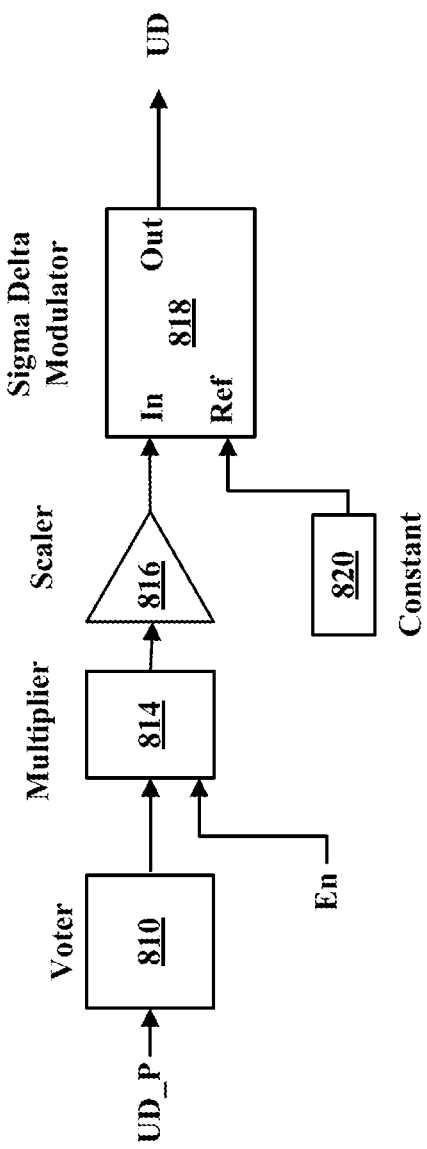
FIG. 8 illustrates pre-cursor update logic according to an embodiment of the present disclosure.

FIG. 8 illustrates pre-cursor update logic 800 for updating the pre-cursor tap based on the UD_P signal produced by the pre-cursor control logic 700, according to an embodiment of the present disclosure. The update logic 800 may be located in the pre-cursor control unit of the receiver, together with the control logic 700. The update logic 800 includes a voter unit 810, a multiplier/product forming unit 814, a scaler 816, a sigma delta modulator 818, and constant generator 820.

The voter unit 810 evaluates multiple instances of UD_P to reduce the multiple instances to a single value based on a trend of the UD_P values. For example, if the voter unit evaluates 16 samples, 9 of which are positive and 7 negative, the voter may output a single positive value since the majority of the samples were positive.

The multiplier 814 multiplies the voter output with an enable signal En to form a product.

The scaler 816 takes the product and scales it by a specified coefficient. The scaling coefficient can be set to 1 if desired. Although it is possible to use the output of the scaler to directly control the pre-cursor tap, it may be preferable to evaluate the scaled values over a period of time before making a decision as to whether the pre-cursor tap should be adjusted up or down. This can be done using a sigma delta modulator.

The sigma delta modulator 818 accumulates the scaled values by keeping a running count of the scaled values until one of two count thresholds is reached, at which point the sigma delta modulator 818 outputs a signal UD to indicate which of the thresholds has been reached. For example, the thresholds can be set to plus and minus 256, based on a value provided by the constant generator 820. Each 1 value will increment the count, while each −1 value will decrement the count. The sigma delta modulator 818 may output a 0 until the count reaches one of the thresholds. When the count reaches either threshold, the corresponding value is output, e.g., a 1 is output after the count reaches +256 and a −1 is output after the count reaches −256. The signal UD is then sent to a tap controller to adjust the coefficient of the pre-cursor tap up or down by a predetermined amount. For example, each UD value of +1 may increment the coefficient by a fixed value, and each UD value of −1 may decrement the coefficient by the same value.

Figure 9:
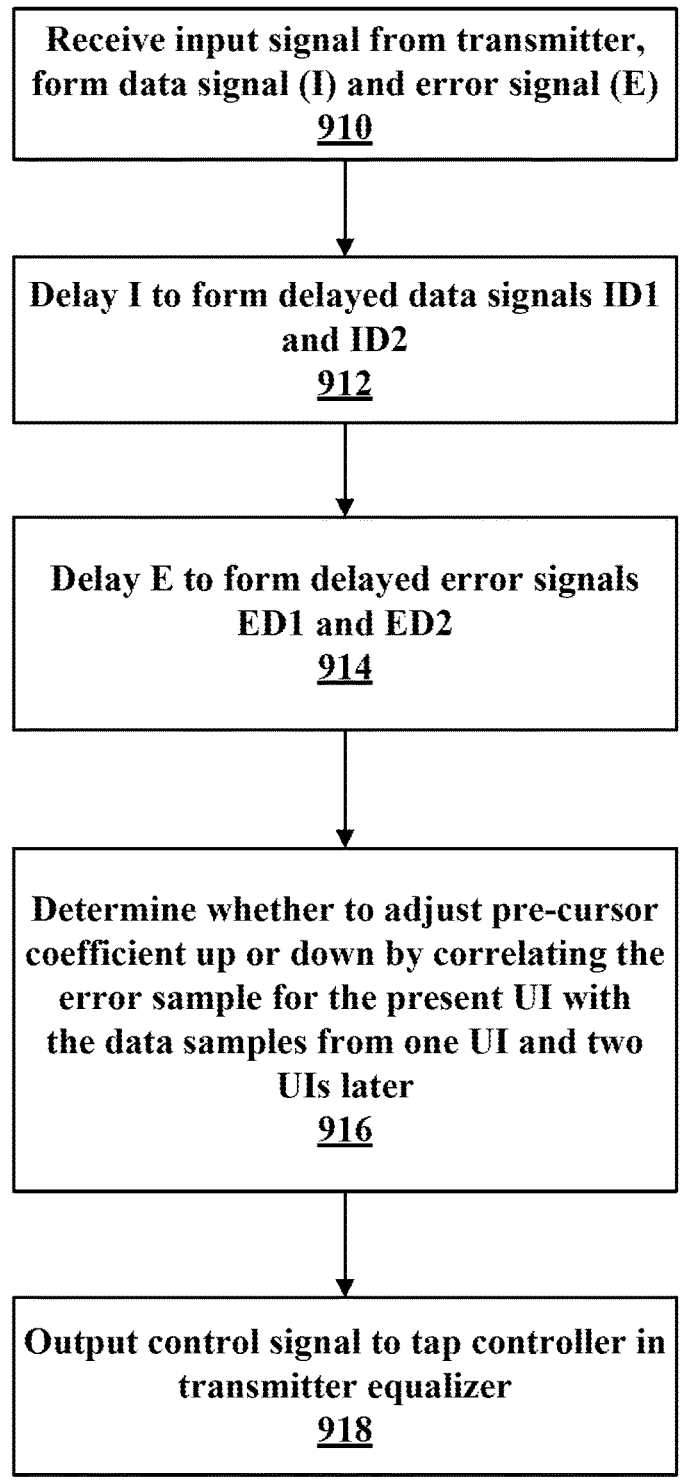
FIG. 9 is a flowchart of a method for controlling a pre-cursor coefficient in a transmit equalizer according to an embodiment of the present disclosure.

FIG. 9 is a flowchart of a method 900 for controlling a pre-cursor coefficient in a transmit equalizer according to an embodiment of the present disclosure. The method may be performed by a receiver according to an earlier described embodiment. In step 910, the receiver receives an analog input signal Rx from the transmitter. The input signal Rx may be AC coupled via the front end of the receiver into a sampler. The sampler converts the input signal into a data signal I and forms an error signal E by comparing input signal Rx to an expected value, e.g., to a positive error threshold voltage.

In step 912, the data signal I is delayed by one UI and two UIs to form delayed signals ID1 and ID2, respectively.

In step 914, the error signal E is delayed by one UI and two UIs to form delayed signals ED1 and ED2, respectively. The delayed signals ID1, ID2, ED1, and ED2 may be formed by a deserializer that provides the delayed signals as parallel inputs to a pre-cursor control unit in the receiver.

In step 916, the pre-cursor control unit forms a tap control signal by correlating the error sample for the present UI with the data samples from one UI and two UIs later, using the delayed data signals ID1 and ID2, and the delayed error signals ED1 and ED2. The correlation can be performed using an LMS algorithm. As explained earlier, if the error signal was formed based on a single error threshold, then the error samplers for deciding how to adjust the pre-cursor coefficient can be simplified to produce an up/down control signal based on a sign-sign LMS algorithm. The sign-sign LMS algorithm is significantly less computation intensive and therefore better suited to high speed data transmission than a full LMS algorithm.

In step 918, the pre-cursor control unit outputs the control signal to a tap controller in a transmitter equalizer, thereby adjusting the pre-cursor coefficient for the data signal I.

The description of the foregoing embodiments may refer to algorithms, sequences, and operations that require processor execution of program instructions stored in memory. Memory may include a computer readable storage medium, which is not limited to, but may include, any type of disk, including floppy disks, optical disks, CD-ROMs, magnetic-optical disks, and other memory such as read-only memory (ROMs), random access memory (RAMs), electrically erasable programmable read-only memory (EEPROM), flash memory, magnetic or optical cards, or any other type of media capable of storing program instructions.

In the foregoing description, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for controlling a pre-cursor coefficient in an equalizer of a transmitter device, the method comprising:
   converting an input signal from the transmitter into a data signal, wherein the data signal includes data symbols transmitted in successive unit intervals;
   forming an error signal by comparing the input signal to a threshold value; and
   determining whether to adjust the pre-cursor coefficient, by correlating a sample of the error signal with samples of the data signal from one unit interval earlier and two unit intervals earlier.

2. The method of claim 1, further comprising:
   sending a control signal to a tap controller in the transmitter, wherein the control signal indicates whether the pre-cursor coefficient is to be adjusted up or down or left unchanged.

3. The method of claim 1, wherein the correlating is performed using a sign-sign Least Means Square (LMS) algorithm.

4. The method of claim 3, wherein the sign-sign LMS algorithm includes:
   multiplying a sign of a data sample by a sign of a first delayed error sample;
   multiplying a sign of the data sample by a sign of a second delayed error sample; and
   processing results of the multiplying steps through control logic that combines the results to form a control signal that adjusts the pre-cursor coefficient.

5. The method of claim 4, wherein the error signals are binary signals that indicate whether a value of the input signal is above or below the threshold value.

6. The method of claim 5, wherein the multiplying steps are performed by XOR gates.

7. The method of claim 1, wherein the error signal is delayed relative to the data signal.

8. The method of claim 7, wherein the error signal is delayed using a deserializer that also delays the data signal to form a set of data and error signals as input to a pre-cursor control unit that performs the determining of whether to adjust the pre-cursor coefficient.

9. The method of claim 1, wherein the pre-cursor coefficient is assigned to a single tap of the equalizer.

10. The method of claim 9, wherein the equalizer is a feed forward equalizer.

11. A receiver device for controlling a pre-cursor coefficient in an equalizer of a transmitter device, the receiver device comprising:
    a first circuit arrangement configured to convert an input signal from the transmitter into a data signal, wherein the data signal includes data symbols transmitted in successive unit intervals;
    a second circuit arrangement configured to form an error signal by comparing the input signal to a threshold value; and
    a pre-cursor control unit configured to determine whether to adjust the pre-cursor coefficient, by correlating a sample of the error signal with samples of the data signal from one unit interval earlier and two unit intervals earlier.

12. The receiver device of claim 11, wherein the pre-cursor control unit sends a control signal to a tap controller in the transmitter, and wherein the control signal indicates whether the pre-cursor coefficient is to be adjusted up or down or left unchanged.

13. The receiver device of claim 11, wherein the pre-cursor control unit performs the correlating using a sign-sign Least Means Square (LMS) algorithm.

14. The receiver device of claim 13, wherein the sign-sign LMS algorithm includes:
    multiplying a sign of a data sample by a sign of a first delayed error sample;
    multiplying a sign of the data sample by a sign of a second delayed error sample; and
    processing results of the multiplying steps through control logic that combines the results to form a control signal that adjusts the pre-cursor coefficient.

15. The receiver device of claim 14, wherein the error signals are binary signals that indicate whether a value of the input signal is above or below the threshold value.

16. The receiver device of claim 15, wherein the multiplying steps are performed by XOR gates in the pre-cursor control unit.

17. The receiver device of claim 11, further comprising:
    a circuit arrangement configured to delay the error signal relative to the data signal.

18. The receiver device of claim 17, wherein the circuit arrangement configured to delay the error signal is a deserializer that also delays the data signal to form a set of data and error signals as input to the pre-cursor control unit.

19. The receiver device of claim 11, wherein the pre-cursor coefficient is assigned to a single tap of the equalizer.

20. The receiver device of claim 19, wherein the equalizer is a feed forward equalizer.

* * * * *